(12) United States Patent
Allen et al.

(10) Patent No.: US 7,171,445 B2
(45) Date of Patent: Jan. 30, 2007

(54) FIXED SNOOP RESPONSE TIME FOR SOURCE-CLOCKED MULTIPROCESSOR BUSSES

(75) Inventors: James W. Allen, Georgetown, TX (US); Michael John Mayfield, Austin, TX (US); Alvan Wing Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 10/042,103

(22) Filed: Jan. 7, 2002

(65) Prior Publication Data
US 2003/0131138 A1 Jul. 10, 2003

(51) Int. Cl.
*G06F 1/12* (2006.01)
*G06F 13/40* (2006.01)

(52) U.S. Cl. .................. 709/203; 713/401; 713/503; 713/600; 710/100; 710/126

(58) Field of Classification Search ........ 709/201–203, 709/204, 211–213; 711/146, 117; 712/10, 712/203, 32; 370/211; 710/100
See application file for complete search history.

(56) References Cited

U.S. PATENT DOCUMENTS

| | | | | |
|---|---|---|---|---|
| 5,555,382 A | * | 9/1996 | Thaller et al. | 710/113 |
| 6,018,620 A | * | 1/2000 | Culley et al. | 710/52 |
| 6,070,205 A | * | 5/2000 | Kato et al. | 710/100 |
| 6,557,068 B2 | * | 4/2003 | Riley et al. | 710/306 |
| 6,754,838 B2 | * | 6/2004 | Burns et al. | 713/401 |

* cited by examiner

*Primary Examiner*—David Wiley
*Assistant Examiner*—Jude Jean-Gilles
(74) *Attorney, Agent, or Firm*—Carr LLP; Diana R. Gerhardt

(57) ABSTRACT

An interfacing logic is implemented in one or more processors and a memory controller in a multiprocessor system. The interfacing logic enables all processors to receive snoops and snoop responses substantially at the same time by delaying data transmitted over faster busses before the data is provided to a local logic at a receiving end of the faster busses. The interfacing logic comprises two or more paths of a multiplexer component connected to a storage component. The storage components are connected to another multiplexer component for selecting one of the two or more paths. Preferably, a bus control logic in the receiving end determines how much delay is performed to compensate for delay differences between data busses.

20 Claims, 3 Drawing Sheets

FIXED SNOOP RESPONSE TIME FOR SOURCE-CLOCKED MULTIPROCESSOR BUSSES

BACKGROUND OF THE INVENTION

1. Field of the Invention

The invention relates generally to a multiprocessor system and, more particularly, to maintaining identical bus delays for different processors in a multiprocessor system.

2. Description of the Related Art

In a switch-based multiprocessor system using high-speed, source-clocked, unidirectional point-to-point busses, with different wiring delay timing differences between busses, the natural choice for implementation of a snoop based protocol, would be to allow variations in snoop address and snoop response times. However, this introduces complexity in the design.

In a standard snoop protocol used in a signal bus, bus masters, which take control of the bus, arbitrate for the bus and present their address and command on the bus when access is granted. Each processor or memory controller attached to the bus sees the address and command at the same time and generates its snoop response at a time specified by the bus architecture. Then, the snoop response becomes valid after the snoop request has been received by the snooping memory controller and processor.

In a multiprocessor system, two or more processors source commands and addresses on processor outbound busses to a memory controller. Typically, the memory controller may function as a bus switch and an address switch. The memory controller arbitrates between the processor busses, selecting one processor outbound command to reflect back to all the processors, via processor inbound busses. Since there may be wiring delay differences between the processor inbound busses, a command provided to the processors at the same memory controller clock may not arrive at the processors at the same time. Similarly, when the multiprocessor system has point-to-point, unidirectional, source-clocked snoop response busses, these busses carrying snoop responses may also have wiring delay differences between the processors.

The differences in bus delays complicate the snoop protocol, if differences are allowed between when each processor observes the snoop response for a particular snoop. In addition, the memory controller job of combining the snoop responses is more difficult, if the memory controller sees the responses for a particular snoop at different times from each processor.

Therefore, there is a need for aligning the snoop addresses and snoop responses across all busses. This would allow the snoop protocol to be a simple variant of single bus based snoop protocol.

SUMMARY OF THE INVENTION

The present invention provides a multiprocessor system.

In one embodiment of the present invention, a first microprocessor has one or more interfacing logics including a first interfacing logic. The first microprocessor is clocked by a first system clock. A memory controller is connected to the first interfacing logic through at least a first bus for transmitting at least a first signal from the memory controller to the first interfacing logic. The memory controller is clocked by a second system clock. A second microprocessor is connected to the memory controller through at least a second bus for transmitting at least a second signal from the memory controller to the second processor. The second bus requires a first period of time more to transmit the second signal than what the first bus requires to transmit the first signal. The first interfacing logic delays the first signal by the first period of time so that the first and the second signals are respectively received by the first and the second microprocessors substantially at the same time.

In another embodiment of the present invention, a memory controller has one or more interfacing logics including a first interfacing logic. The memory controller is clocked by a first system clock. A first microprocessor is connected to the first interfacing logic through at least a first bus for transmitting at least a first signal from the first microprocessor to the first interfacing logic. The first microprocessor is clocked by a second system clock. A second microprocessor is connected to the memory controller through at least a second bus for transmitting at least a second signal from the second processor to the memory controller. The second bus requires a first period of time more to transmit the second signal than what the first bus requires to transmit the first signal. The first interfacing logic delays the first signal by the first period of time so that the first and the second signals are respectively received by the first and the second microprocessors substantially at the same time.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
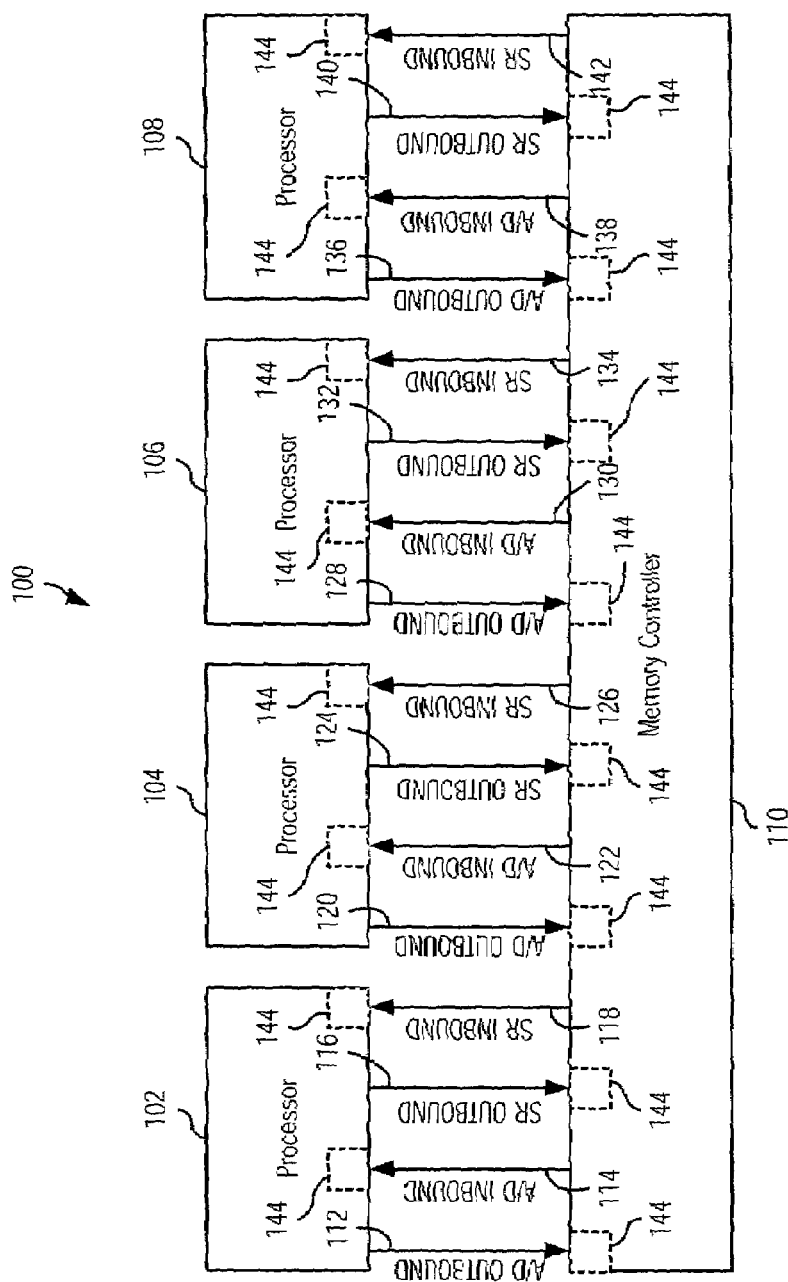
FIG. 1 depicts a multiprocessor system and a bus configuration thereof.
Figure 2:
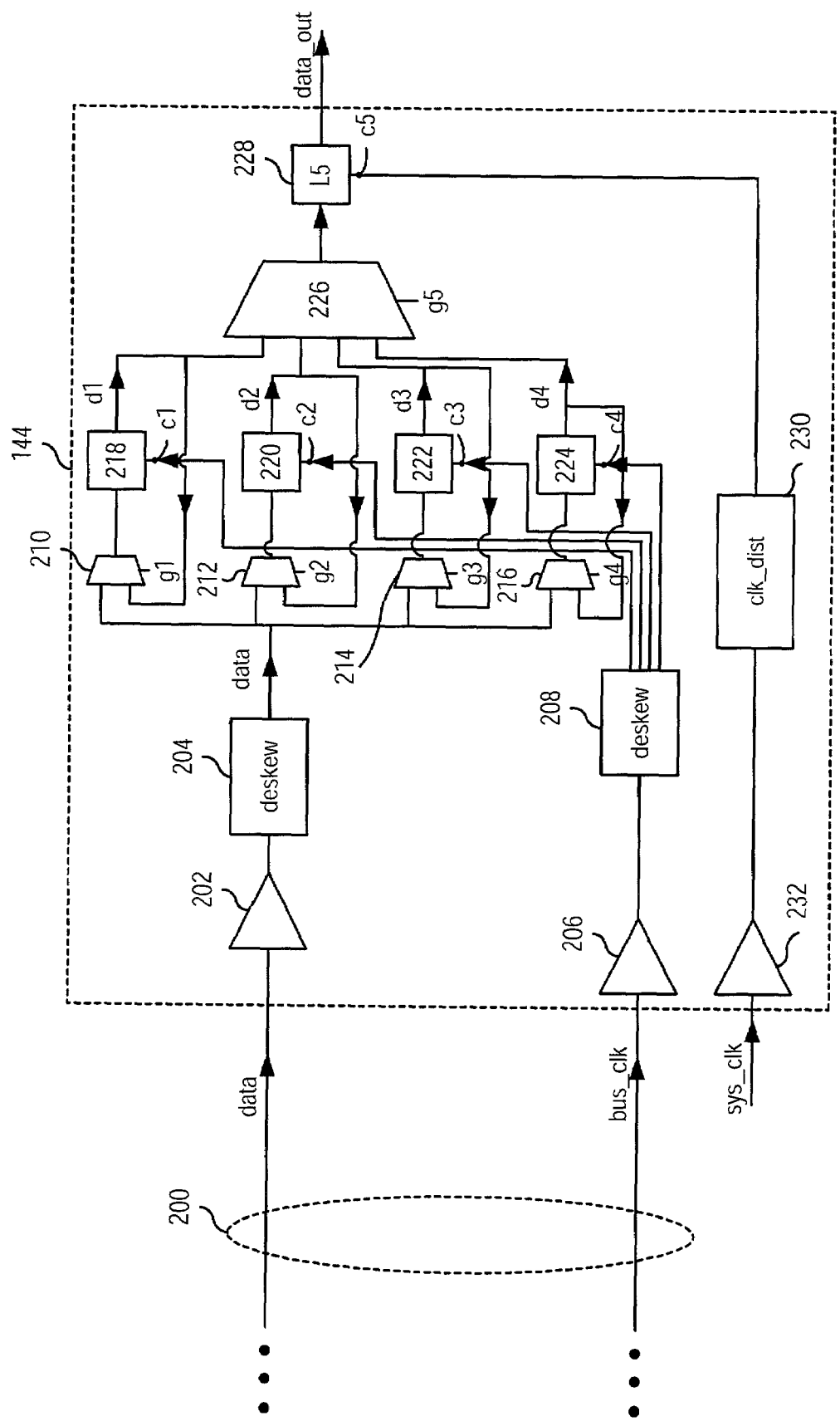
FIG. 2 depicts a block diagram showing one embodiment of an interfacing logic connected to a bus of the multiprocessor system as shown in FIG. 1.
Figure 3:
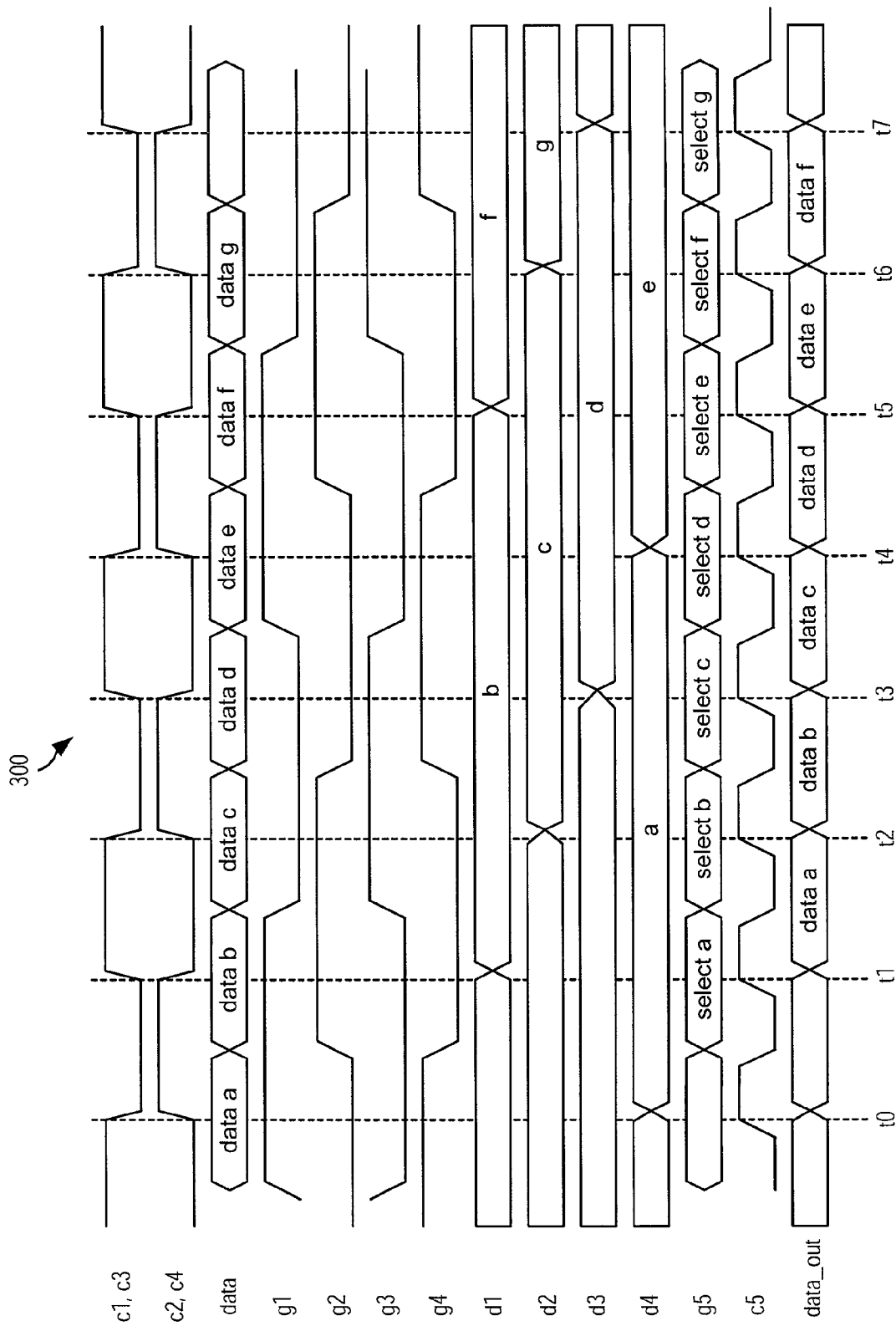
FIG. 3 depicts a timing diagram showing control signals used in FIG. 2 in an embodiment of the present invention.

The principles of the present invention and their advantages are best understood by referring to the illustrated operations of embodiment depicted in FIGS. 1–3.

In FIG. 1, a reference numeral 100 designates a multiprocessor system having four processors 102, 104, 106, and 108, each of which is connected to a memory controller 110. The processors 102, 104, 106, and 108 each represents any type of processor having computing capabilities. Also, the number of processors may vary depending on the configuration of the multiprocessor system 100. The memory controller 110 has address and bus switch functionalities. Alternatively, the memory controller 110 is replaceable with address switch without departing from the true spirit of the present invention.

The processor 102 is connected to the memory controller 110 through an address/data outbound bus 112 for transmitting addresses and data from the processor 102 to the memory controller 110. An address/data inbound bus 114 is also shown to connect the processor 102 and the memory controller 110 for transmitting addresses and data from the memory controller 110 to the processor 102. A snoop response outbound bus 116 is shown to connect the processor 102 and the memory controller 110 for transmitting snoop responses from the processor 102 to the memory controller 110. A snoop response inbound bus 118 is shown to connect the processor 102 and the memory controller 110 for transmitting snoop responses from the memory controller 110 to the processor 102.

The other three processors 104, 106, and 108 are connected to the memory controller in a similar fashion. An address/data outbound bus 120, an address/data inbound bus 122, a snoop response outbound bus 124, and a snoop response inbound bus 126 are similarly shown to connect the processor 104 and the memory controller 110. Likewise, an address/data outbound bus 128, an address/data inbound bus 130, a snoop response outbound bus 132, and a snoop response inbound bus 134 are shown to connect the processor 106 and the memory controller 110. Finally, an address/data outbound bus 136, an address/data inbound bus 138, a snoop response outbound bus 140, and a snoop response inbound bus 142 are shown to connect the processor 108 and the memory controller 110.

The multiprocessor system 100 preferably uses a high frequency (e.g., 1 GHz), point-to-point, unidirectional, source-clocked busses. The processors 102, 104, 106, and 108 source addresses and commands (i.e., data) on their respective address/data outbound busses 112, 120, 128, and 136 to the memory controller 110. As mentioned above, the memory controller 110 implements a system bus switch. Thus, the memory controller 110 arbitrates between the four processor busses, selecting one processor outbound command to reflect back to all four processors 102, 104, 106, and 108, via their respective address/data inbound busses 114, 122, 130, and 138. Since there may be wiring delay differences between the four processor inbound busses 114, 122, 130, and 138, a command sourced to the processor at a memory controller clock (not shown) may not arrive at the processors 102, 104, 106, and 108 at the same time.

Similarly, the multiprocessor system 100 has point-to-point, unidirectional, source-clocked snoop response busses. The snoop response outbound busses 116, 124, 132, and 140 carry the snoop responses of the respective processors 102, 104, 106, and 108. The snoop response inbound busses 118, 126, 134, and 142 carry a snoop response, which is a combination by the memory controller 110 of the snoop responses of all the processors 102, 104, 106, and 108. These snoop response busses may also have wiring delay differences between the processors 102, 104, 106, and 108.

A reference numeral 144 designates an interfacing logic at the receiving end of each of the busses 112 through 142 as shown in FIG. 1. Preferably, the interfacing logic 144 is implemented in the processors 102, 104, 106, and 108, as well as in the memory controller 110. The interfacing logics 144 implemented in the processors enable all the processors 102, 104, 106, and 108 to receive their snoop commands or snoop responses at the same bus clock by adding delay to busses with less delay to remove any delay differences between the busses directed to the processors 102, 104, 106, and 108. Likewise, the interfacing logics 144 implemented in the memory controller 110 enable the memory controller 110 to receive all snoop responses at the same bus clock by adding delay to busses with less delay to remove any delay differences between the busses directed to the memory controller 110.

Referring now to FIG. 2, one embodiment of the interfacing logic 144 is shown to be connected to a data bus 200. The data bus 200 can be any of the busses 112 through 142 as shown in FIG. 1. As mentioned above, the interfacing logic 144 is implemented in the receiving end of the data bus 200. The data carried on the data bus 200 can be any of a snoop command, a snoop response, an address, and a command, depending on the type of the data bus 200. Generally, the data bus 200 is n-bit wide for data transmission, and m-bit wide for clock transmission (n and m are integers larger than zero).

The interfacing logic 144 has a chip receiver 202 for receiving the data transmitted on the data bus 200. Optionally, the chip receiver 202 is connected to a deskew circuit 204. The deskew circuit 204 generally comprises a delay mechanism for adjusting delay differences between different bit lines in the data bus 200. Since different bit lines in the same data bus may lead to different delays, the deskew circuit 204 compensates for the difference. The data bus 200 also transmits a bus clock bus_clk from a launch chip (not shown). The launch chip is implemented either in the memory clock 110 of FIG. 1 or in one of the processors 102, 104, 106, and 108 of FIG. 1, depending on the location of the interfacing logic 144 in FIG. 1. In either case, the bus_clk is the same as, or derived from, a bus clock (not shown) of the launch chip. For example, if the data bus 200 represents the address/data outbound bus 112 of FIG. 1, then the bus_clk is the same as, or derived from, a bus clock of the processor 102 of FIG. 1. If the data bus 200 represents the address/data inbound bus 114 of FIG. 1, then the bus_clk is the same as, or derived from, a bus clock of the memory controller 110.

A chip receiver 206 is connected to the data bus 200 for receiving the bus_clk. The chip receiver 206 is also connected to a deskew circuit 208. The deskew circuit 208 adjusts delay differences between different bit lines. Additionally, the deskew circuit 208 does the job of splitting the bus_clk into c1–c4 clock signals. Alternatively, a clock generator (not shown) could be used to split the bus_clk into c1–c4 clock signals. Preferably, the c1 and c3 clock signals are the deskewed version of the bus_clk. The c2 and c4 clock signals are the inversions of the c1 and c3 clock signals, respectively.

The deskew circuit 204 is connected to four select circuits 210, 212, 214, and 216 for sending data to the four select circuits 210, 212, 214, and 216. The select circuits 210, 212, 214, and 216 are connected to latches 218, 220, 222, and 224, respectively, for sending data to the respective latches 218, 220, 222, and 224, and for receiving feedback data from the respective latches 218, 220, 222, and 224. The select circuits 210, 212, 214, and 216 are controlled by control signals g1, g2, g3, and g4, respectively. The select circuits 210, 212, 214, and 216 are configured to output the data received from the deskew circuit 204 when the control signals are asserted, and are configured to output the feedback data received from the latches 218, 220, 222, and 224 when the control signals are deasserted. The deskew circuit 208 is connected to the latches 218, 220, 222, and 224 for clocking them using the c1, c2, c3, and c4 signals, respectively. As mentioned above, the c1, c2, c3, and c4 signals are derived from the bus_clk. The latches 218, 220, 222, and 224 each may be replaced with a register (not shown) comprising a N number of latches (not shown). In that case, the data received by the interfacing circuit 144 is N bits.

A multiplexer 226 is connected to the latches 218, 220, 222, and 224 for receiving data d1, d2, d3, and d4, respectively. The multiplexer 226 is also connected to a latch 228 for outputting data. A control signal g5 controls the multiplexer 226. The control signals g1, g2, g3, g4, and g5 received by the multiplexers 210, 212, 214, 216, and 226, respectively, are derived from a control logic (now shown) implemented in the receiving end of the data transmission. The latch 228 is also connected to a clock distributor clk_dist 230 for receiving system clock $sys_{13}$ clk signal. The $sys_{13}$ clk signal is a system clock signal of the receiving end. The $clk_{13}$ dist is connected to a chip receiver 232. The latch 228 outputs a $data_{13}$ out signal and receives a new data at the rising edge of the clock signal c5. Optionally, a clock generator (not shown) may be inserted between the chip receiver 232 and the $clk_{13}$ dist 230 for generating the c5 clock having different frequency from that of the $sys_{13}$ clk signal.

Preferably, the control signals g1 through g4 are generated by a first local logic (not shown), which is driven by the deskewed bus_clk. The control signal g5 is generated by a second local logic (not shown), which is driven by the c5 clock. A detailed sequence of the control signals g1 through g5 is shown in FIG. 3. The sequence of the control signal g5 relative to the receiving data d1, d2, d3, and d4 can be changed by a programmable parameter (not shown) such that the $data_{13}$ out signal coming from the latch 228 is delayed by a variable amount relative to the data out of the deskew circuit 204. Preferably, the programmable parameter contains information on the amount of such delay.

The data bus 200 represents any one of sixteen busses shown in FIG. 1. Assume here that the data bus 200 is one of four address/data inbound busses as shown in FIG. 1. These busses are used to transmit data from the memory controller 110 to the processors 102, 104, 106, and 108. When the $bus_{13}$ clk is operating at a high frequency such as 1 GHz, the data transmit time through the data bus 200 may be greater than one bus_clk. Many factors such as bus and data control logic, chip placement, and interchip wiring rules, and bus physical layer controls the skew between the bits on a single bus. Therefore, delays of different busses may be different. These delay differences are handled by delaying the transferring of data to the local latch on faster busses by one or more bus clocks. FIG. 2 shows a circuit configuration of a receiving end of a bus with more delay than other busses. The interfacing logic 144 is configured for delaying up to three bus clocks.

The number of select circuits and latches is changeable without departing from the true spirit of the present invention. Here, four select circuits and four latches are used. It can be any plural number, depending on how much delay is necessary.

In FIG. 3, a timing diagram 300 depicts the clock signals and the control signals as shown in FIG. 2. The timing diagram 300 presents the operation of the interfacing logic 144. The data as noted in the timing diagram 300 represents the data output from the deskew 204 of FIG. 2. Before time t0, data a is input to the select circuits 210, 212, 214, and 216. Right before time t0, the control signals g1 and g4 were asserted. Thus, the latches 218 and 224 received the data from the select circuits 210 and 216, respectively. At time t0, the clock signals c1 and c3 are deasserted, whereas the clock signals c2 and c4 are asserted. Assuming that the latches are triggered at the rising edges of clock pulses, the multiplexer 226 will receive updated inputs from the latches 220 and 224 at time t0. Since the multiplexer 212 outputs the feedback data received from the latch 220, however, the multiplexer 226 will only receive a new data d4 from the latch 224 at time t0. Thus, the data a block is shown in d4 after time t0. The data a passes through the multiplexer 226 when the g5 control signal selects the output of the multiplexer 224. This is shown in the timing diagram 300 as between time t0 and t1. It is noted here that the g5 control signal did not select the output of the multiplexer 224 when the data a is input the select circuits 216. Rather, the g5 control signal intentionally delayed this action by one clock cycle of the $sys_{13}$ clk signal. After the rising edge of the g5 signal for selecting the data a, the latch 228 outputs the data a at the rising edge of the c5 clock signal, which occurs at time t1. Thus, the data a is carried in the $data_{13}$ out signal slightly after the time t1 as shown in the timing diagram 300.

Similarly, subsequent data b, c, d, e, f, and g are transmitted through the data bus 200 and go through the interfacing logic 144 before carried over to a local logic (not shown) of receiving end. Therefore, all data transmitted through the data bus 200 would be delayed by one cycle of the c5 signal. The amount of delay in the number of clock cycle of the c5 signal is determined by the bus control logic generating the control signals g1–5.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A multiprocessor system comprising:
    a first microprocessor having one or more interfacing logics including a first interfacing logic, the first microprocessor being clocked by a first system clock;
    a memory controller connected to the first interfacing logic through at least a first bus for transmitting at least a first signal from the memory controller to the first interfacing logic, the memory controller being clocked by a second system clock; and
    a second microprocessor connected to the memory controller through at least a second bus for transmitting at least a second signal from the memory controller to the second processor, the second bus requiring a first period of time more to transmit the second signal than what the first bus requires to transmit the first signal, the first interfacing logic delaying the first signal by the first period of time so that the first and the second signals are respectively received by the first and the second microprocessors substantially at the same time.

2. The multiprocessor system of claim 1, wherein the second microprocessor comprises a second interfacing logic connected to the second bus.

3. The multiprocessor system of claim 1, wherein the second microprocessor comprises a second interfacing logic connected to the second bus, and wherein the second interfacing logic does not delay the second signal.

4. The multiprocessor system of claim 1, wherein the second microprocessor comprises a second interfacing logic connected to the second bus, and wherein the first interfacing logic delays the first signal by a second period of time and the second interfacing logic delays the second signal by a third period of time so that the first and the second signals are respectively received by the first and the second microprocessors substantially at the same time.

5. The multiprocessor system of claim 1, wherein the memory controller comprises an address switch.

6. The multiprocessor system of claim 1, wherein the first and the second signals carry the same data.

7. The multiprocessor system of claim 1, wherein the first interfacing logic comprises:
    a first multiplexer configured for receiving the first signal and generating a first multiplexer output signal and controlled by a first control signal;
    a first storage component connected to the first multiplexer for receiving the first multiplexer output signal from the first multiplexer and for providing a first storage-component output signal to the first multiplexer, the first storage component being clocked by a first control clock derived from the second system clock;

a second multiplexer configured for receiving the first signal and generating a second multiplexer output signal and controlled by a second control signal;

a second storage component connected to the second multiplexer for receiving the second multiplexer output signal from the second multiplexer and for providing a second storage-component output signal to the second multiplexer, the second storage component being clocked by a second control clock derived from the second system clock;

a third multiplexer connected to at least the first and the second storage components for receiving the first and the second storage-component output signals and for generating a third multiplexer output signal, the third multiplexer being controlled by a third control signal; and a third storage component connected to the third multiplexer for receiving the third multiplexer output signal from the third multiplexer and clocked by a third control clock derived from the first system clock.

8. The multiprocessor system of claim 1, wherein the first interfacing logic comprises:

a first multiplexer configured for receiving the first signal and generating a first multiplexer output signal and controlled by a first control signal;

a first storage component connected to the first multiplexer for receiving the first multiplexer output signal from the first multiplexer and for providing a first storage-component output signal to the first multiplexer, the first storage component being clocked by a first control clock derived from the second system clock;

a second multiplexer configured for receiving the first signal and generating a second multiplexer output signal and controlled by a second control signal;

a second storage component connected to the second multiplexer for receiving the second multiplexer output signal from the second multiplexer and for providing a second storage-component output signal to the second multiplexer, the second storage component being clocked by a second control clock derived from the second system clock;

a third multiplexer configured for receiving the first signal and generating a third multiplexer output signal and controlled by a third control signal;

a third storage component connected to the third multiplexer for receiving the third multiplexer output signal from the third multiplexer and for providing a third storage-component output signal to the third multiplexer, the third storage component being clocked by a third control clock derived from the second system clock;

a fourth multiplexer connected to at least the first, the second, and the third storage components for receiving the first, the second, and the third storage-component output signals and for generating a fourth multiplexer output signal, the fourth multiplexer being controlled by a fourth control signal; and a fourth storage component connected to the fourth multiplexer for receiving the fourth multiplexer output signal from the fourth multiplexer and clocked by a fourth control clock derived from the first system clock.

9. The multiprocessor system of claim 1, wherein the first interfacing logic comprises:

a first multiplexer configured for receiving the first signal and generating a first multiplexer output signal and controlled by a first control signal;

a first storage component connected to the first multiplexer for receiving the first multiplexer output signal from the first multiplexer and for providing a first storage-component output signal to the first multiplexer, the first storage component being clocked by a first control clock derived from the second system clock;

a second multiplexer configured for receiving the first signal and generating a second multiplexer output signal and controlled by a second control signal;

a second storage component connected to the second multiplexer for receiving the second multiplexer output signal from the second multiplexer and for providing a second storage-component output signal to the second multiplexer, the second storage component being clocked by a second control clock derived from the second system clock;

a third multiplexer configured for receiving the first signal and generating a third multiplexer output signal and controlled by a third control signal;

a third storage component connected to the third multiplexer for receiving the third multiplexer output signal from the third multiplexer and for providing a third storage-component output signal to the third multiplexer, the third storage component being clocked by a third control clock derived from the second system clock;

a fourth multiplexer configured for receiving the first signal and generating a fourth multiplexer output signal and controlled by a fourth control signal;

a fourth storage component connected to the fourth multiplexer for receiving the fourth multiplexer output signal from the fourth multiplexer and for providing a fourth storage-component output signal to the fourth multiplexer, the fourth storage component being clocked by a fourth control clock derived from the second system clock;

a fifth multiplexer connected to at least the first, the second, the third, and the fourth storage components for receiving the first, the second, the third, and the fourth storage-component output signals and for generating a fifth multiplexer output signal, the fifth multiplexer being controlled by a fifth control signal; and a fifth storage component connected to the fifth multiplexer for receiving the fifth multiplexer output signal from the fifth multiplexer and clocked by a fifth control clock derived from the first system clock.

10. A multiprocessor system comprising:

a memory controller having one or more interfacing logics including a first interfacing logic, the memory controller being clocked by a first system clock;

a first microprocessor connected to the first interfacing logic through at least a first bus for transmitting at least a first signal from the first microprocessor to the first interfacing logic, the first microprocessor being clocked by a second system clock; and a second microprocessor connected to the memory controller through at least a second bus for transmitting at least a second signal from the second processor to the memory controller, the second bus requiring a first period of time more to transmit the second signal than what the first bus requires to transmit the first signal, the first interfacing logic delaying the first signal by the first period of time so that the first and the second signals are respectively received by the memory controller substantially at the same time.

11. The multiprocessor system of claim 10, wherein the memory controller comprises a second interfacing logic connected to the second bus.

12. The multiprocessor system of claim 10, wherein the memory controller comprises a second interfacing logic connected to the second bus, and wherein the second interfacing logic does not delay the second signal.

13. The multiprocessor system of claim 10, wherein the memory controller comprises a second interfacing logic connected to the second bus, and wherein the first interfacing logic delays the first signal by a second period of time and the second interfacing logic delays the second signal by a third period of time so that the first and the second signals are received by the memory controller substantially at the same time.

14. The multiprocessor system of claim 10, wherein the memory controller comprises an address switch.

15. The multiprocessor system of claim 10, wherein the first and the second signals carry the same data.

16. The multiprocessor system of claim 10, wherein the first interfacing logic comprises:
   a first multiplexer configured for receiving the first signal and generating a first multiplexer output signal and controlled by a first control signal;
   a first storage component connected to the first multiplexer for receiving the first multiplexer output signal from the first multiplexer and for providing a first storage-component output signal to the first multiplexer, the first storage component being clocked by a first control clock derived from the second system clock;
   a second multiplexer configured for receiving the first signal and generating a second multiplexer output signal and controlled by a second control signal;
   a second storage component connected to the second multiplexer for receiving the second multiplexer output signal from the second multiplexer and for providing a second storage-component output signal to the second multiplexer, the second storage component being clocked by a second control clock derived from the second system clock;
   a third multiplexer connected to at least the first and the second storage components for receiving the first and the second storage-component output signals and for generating a third multiplexer output signal, the third multiplexer being controlled by a third control signal; and
   a third storage component connected to the third multiplexer for receiving the third multiplexer output signal from the third multiplexer and clocked by a third control clock derived from the first system clock.

17. The multiprocessor system of claim 10, wherein the first interfacing logic comprises:
   a first multiplexer configured for receiving the first signal and generating a first multiplexer output signal and controlled by a first control signal;
   a first storage component connected to the first multiplexer for receiving the first multiplexer output signal from the first multiplexer and for providing a first storage-component output signal to the first multiplexer, the first storage component being clocked by a first control clock derived from the second system clock;
   a second multiplexer configured for receiving the first signal and generating a second multiplexer output signal and controlled by a second control signal;
   a second storage component connected to the second multiplexer for receiving the second multiplexer output signal from the second multiplexer and for providing a second storage-component output signal to the second multiplexer, the second storage component being clocked by a second control clock derived from the second system clock;
   a third multiplexer configured for receiving the first signal and generating a third multiplexer output signal and controlled by a third control signal;
   a third storage component connected to the third multiplexer for receiving the third multiplexer output signal from the third multiplexer and for providing a third storage-component output signal to the third multiplexer, the third storage component being clocked by a third control clock derived from the second system clock;
   a fourth multiplexer connected to at least the first, the second, and the third storage components for receiving the first, the second, and the third storage-component output signals and for generating a fourth multiplexer output signal, the fourth multiplexer being controlled by a fourth control signal; and
   a fourth storage component connected to the fourth multiplexer for receiving the fourth multiplexer output signal from the fourth multiplexer and clocked by a fourth control clock derived from the first system clock.

18. The multiprocessor system of claim 10, wherein the first interfacing logic comprises:
   a first multiplexer configured for receiving the first signal and generating a first multiplexer output signal and controlled by a first control signal;
   a first storage component connected to the first multiplexer for receiving the first multiplexer output signal from the first multiplexer and for providing a first storage-component output signal to the first multiplexer, the first storage component being clocked by a first control clock derived from the second system clock;
   a second multiplexer configured for receiving the first signal and generating a second multiplexer output signal and controlled by a second control signal;
   a second storage component connected to the second multiplexer for receiving the second multiplexer output signal from the second multiplexer and for providing a second storage-component output signal to the second multiplexer, the second storage component being clocked by a second control clock derived from the second system clock;
   a third multiplexer configured for receiving the first signal and generating a third multiplexer output signal and controlled by a third control signal;
   a third storage component connected to the third multiplexer for receiving the third multiplexer output signal from the third multiplexer and for providing a third storage-component output signal to the third multiplexer, the third storage component being clocked by a third control clock derived from the second system clock;
   a fourth multiplexer configured for receiving the first signal and generating a fourth multiplexer output signal and controlled by a fourth control signal;
   a fourth storage component connected to the fourth multiplexer for receiving the fourth multiplexer output signal from the fourth multiplexer and for providing a fourth storage component output signal to the fourth multiplexer, the fourth storage component being clocked by a fourth control clock derived from the second system clock;

a fifth multiplexer connected to at least the first, the second, the third, and the fourth storage components for receiving the first, the second, the third, and the fourth storage-component output signals and for generating a fifth multiplexer output signal, the fifth multiplexer being controlled by a fifth control signal; and a fifth storage component connected to the fifth multiplexer for receiving the fifth multiplexer output signal from the fifth multiplexer and clocked by a fifth control clock derived from the first system clock.

19. A system comprising:

a first microprocessor comprising one or more interfacing logics including a first interfacing logic, the first microprocessor being clocked by a first system clock;

a memory controller coupled to the first interfacing logic through at least a first high frequency, point-to-point, unidirectional, source-clocked bus for transmitting at least a first signal from the memory controller to the first interfacing logic, the memory controller being clocked by a second system clock;

a second microprocessor comprising one or more interfacing logics including a second interfacing logic, the second microprocessor being clocked by a third system clock;

the second microprocessor coupled to the memory controller through at least a second high frequency, point-to-point, unidirectional, source-clocked bus for transmitting at least a second signal from the memory controller to the second interfacing logic, the second high frequency, point-to-point, unidirectional, source-clocked bus requiring a first period of time more to transmit the second signal than what the first high frequency, point-to-point, unidirectional, source-clocked bus requires to transmit the first signal; and wherein the first interfacing logic is configured to delay the first signal by a second period of time and the second interfacing logic is configured to delay the second signal by a third period of time so that the first signal and the second signal are respectively received by the first microprocessor and the second microprocessor substantially at the same time.

20. The system as recited in claim 19, wherein the memory controller further comprises one or more interfacing logics including a third interfacing logic and a fourth interfacing logic, and further comprising:

a third high frequency, point-to-point, unidirectional, source-clocked bus coupled to the memory controller and the first microprocessor and configured to transmit at least a third signal from the first microprocessor to the third interfacing logic;

a fourth high frequency, point-to-point, unidirectional, source-clocked bus coupled to the memory controller and the second microprocessor and configured to transmit at least a fourth signal from the second microprocessor to the fourth interfacing logic, the fourth high frequency, point-to-point, unidirectional, source-clocked bus requiring a fourth period of time more to transmit the fourth signal than what the third high frequency, point-to-point, unidirectional, source-clocked bus requires to transmit the third signal; and wherein the third interfacing logic is configured to delay the third signal by a fifth period of time and the fourth interfacing logic is configured to delay the fourth signal by a sixth period of time so that the third signal and the fourth signal are respectively received by the memory controller substantially at the same time.

* * * * *